G. YANTIS.
TIRE.
APPLICATION FILED SEPT. 12, 1913.
1,104,599.
Patented July 21, 1914.
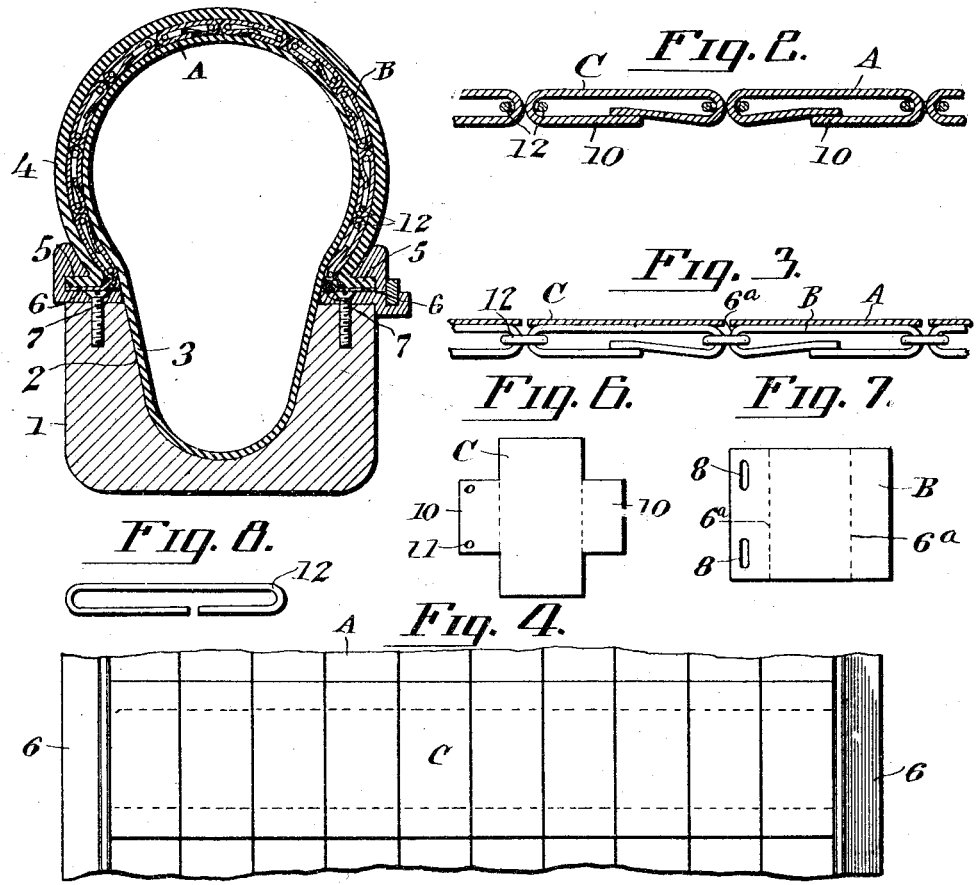
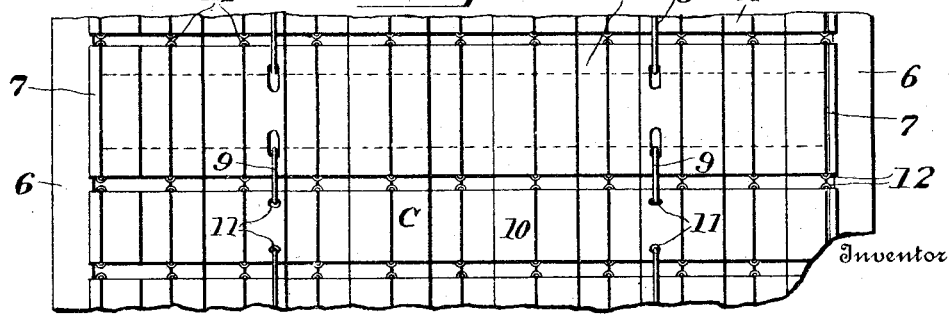
Witnesses
M. F. Garnett.
P. M. Smith.
Inventor
Guy Yantis
By Victor J. Evans
Attorney

UNITED STATES PATENT OFFICE.

GUY YANTIS, OF YANTIS, TEXAS.

TIRE.

1,104,599.  Specification of Letters Patent.  Patented July 21, 1914.

Application filed September 12, 1913. Serial No. 789,534.

*To all whom it may concern:*

Be it known that I, GUY YANTIS, a citizen of the United States, residing at Yantis, in the county of Wood and State of Texas, have invented new and useful Improvements in Tires, of which the following is a specification.

This invention relates to vehicle tires, the object in view being to provide a special form of puncture-proof armor which will occupy a minimum space and which will readily accommodate itself to the flexure of the outer case and inner tube of the tire the said protective armor being composed as a whole of metal of any suitable gage.

With the above and other objects in view, the invention consists in the construction, combination and arrangement of parts, as will hereinafter be more fully described, illustrated and claimed.

In the accompanying drawings: Figure 1 is a cross section through a tire and wheel rim embodying the present invention and showing the protective armor in place. Fig. 2 is a cross section on an enlarged scale through the tire protector. Fig. 3 is a similar view taken at another point. Fig. 4 is an outer face or plan view of a section of the protector. Fig. 5 is an inner plan view or face view of the same. Fig. 6 is a detail plan view of one of the sections of the protector before it is folded, illustrating the folds by dotted lines. Fig. 7 is a similar view of one of the overlapping or adjacent sections spread out and indicating the folds by dotted lines. Fig. 8 is a detail view of one of the connecting links or loops.

Referring to the drawings 1 designates a wheel rim or felly which is ordinarily connected directly to the outer ends of the wheel spokes. This rim or felly, in carrying out the present invention, is made of suitable thickness or depth from its inner to its outer face as illustrated in Fig. 1 and is formed in its outer face with a relatively large cavity or gutter 2 which when the tire is applied to the rim, forms a portion of the air space and receives the inner portion (approximately one half) of the inner tube indicated at 3, which tube contains the compressed air which holds the tire in an inflated condition.

4 designates the outer case or shoe which is made smaller or of less transverse dimensions than the ordinary pneumatic outer case or shoe now in common use, the said outer case 4 being provided with adjoining flanges 5 by means of which the opposite sides or longitudinal edges of the outer case may be fastened securely by any desired means to the rim or felly 1.

In connection with the inner tube 3 and the outer case 4 I use a protector or protective armor indicated generally by the reference character A. This protector or armor is preferably interposed between the inner tube and the outer case as indicated in Fig. 1 and is constructed in the following manner.

6 designates parallel stringers formed of sheet metal of any suitable gage and width, the said stringers extending entirely around the sides or longitudinal edges of the protector. Each of said stringers is formed along its inner edge with knuckles or eyes 7 to which the sheet metal sections of the armor are connected as shown.

The body of the protector is made up of alternate and overlapping transversely extending series of plates or strips of sheet metal, the strips or plates of one series are of uniform width as indicated at B, each of the sections or plates being folded along the parallel lines 6 into overlapping relation as shown and being provided with slots 8 extending longitudinally of the protector as a whole to receive connecting links 9 by means of which the plates of one series are connected to the plates of the adjoining series so as to allow for the necessary longitudinal movement and sliding of one series upon the other thereby allowing for the necessary flexibility or expansion and contraction of the tire both longitudinally and transversely. The alternate series of plates are formed as indicated at C, each of the plates being cut away at the corners to form inwardly extending relatively narrow tabs 10 which overlap each other, certain of the tabs being provided with holes 11 adapted to receive the links 9 above referred to, for the purpose set forth. The plates of each transverse row or series are connected by links or loops 12 which extend through the bights or folds at the adjacent or contiguous edges of the plates thereby providing for a pivotal action between the plates of each series.

By the construction just described, the plates C are of but a single thickness where they overlap the plates B, thus providing for a comparatively thin and yet perfectly continuous and practically puncture-proof armor or protector. All parts of the protector or armor including the stringers may be made of comparatively light or thin sheet metal of sufficient density and toughness to resist puncture by nails and like objects thus greatly increasing the life and durability of the tire as a whole. Furthermore, by forming the rim in the manner illustrated and described, the amount of rubber required to form the outer case 4 is materially reduced thereby economizing in the cost of production of the tire as a whole.

What I claim is:

1. A protector for tires embodying in combination with a pair of stringers, transverse rows or series of plates having a pivotal connection with each other and pivotally attached at opposite ends to said stringers, the series of plates overlapping each other and being formed with slots extending longitudinally of the tire, and links connecting one series of plates with the adjoining series at opposite sides thereof and arranged to slide in said slots.

2. A protector for tires embodying a pair of annular stringers arranged in spaced relation to each other, and transverse rows or series of puncture-proof plates having a jointed connection at their meeting edges and also having a jointed connection with said stringers, the plates of one series being bent upon themselves to form outer and inner walls, and the plates of the adjoining series at opposite sides thereof being cut away to leave portions of a single thickness which bear an overlapping relation to the series at opposite sides thereof, each series being connected with the adjoining series by links which permit a relative sliding movement of the series longitudinally of the tire.

In testimony whereof I affix my signature in presence of two witnesses.

GUY YANTIS.

Witnesses:
 JOHN C. BIRD,
 W. A. ROBINSON.